United States Patent [19]

Foley et al.

[11] Patent Number: 5,537,575

[45] Date of Patent: Jul. 16, 1996

[54] SYSTEM FOR HANDLING CACHE MEMORY VICTIM DATA WHICH TRANSFERS DATA FROM CACHE TO THE INTERFACE WHILE CPU PERFORMS A CACHE LOOKUP USING CACHE STATUS INFORMATION

[76] Inventors: Denis Foley, 88 Lamplighter Dr., Shrewsbury, Mass. 01545; Douglas J. Burns, 4 Black Bear La., Westford, Mass. 01886; Stephen R. Van Doren, 237 South St., Apt. 5, Shrewsbury, Mass. 01749

[21] Appl. No.: 268,403

[22] Filed: Jun. 30, 1994

[51] Int. Cl.⁶ .................................. G06F 13/00
[52] U.S. Cl. ................... 395/468; 395/471; 395/472; 395/473; 395/486; 395/250; 364/239.8; 364/253.1; 364/964.5; 364/964.34; 364/964.342; 364/DIG. 2
[58] Field of Search .............................. 395/250, 425, 395/400, 250, 468, 471, 472, 473, 486; 364/DIG. 1, DIG. 2

[56] References Cited

U.S. PATENT DOCUMENTS

| | | | |
|---|---|---|---|
| 4,713,755 | 12/1987 | Worley, Jr. et al. | 395/375 |
| 4,977,498 | 12/1990 | Rastegar et al. | 395/425 |
| 5,097,409 | 3/1992 | Schwartz et al. | 395/425 |
| 5,155,832 | 10/1992 | Hunt | 395/425 |
| 5,206,941 | 4/1993 | Eikill et al. | 395/425 |
| 5,319,766 | 6/1994 | Thaller et al. | 395/425 |
| 5,353,415 | 10/1994 | Wolford et al. | 395/325 |
| 5,404,483 | 4/1995 | Stamm et al. | 395/425 |
| 5,426,765 | 6/1995 | Stevens et al. | 395/425 |

OTHER PUBLICATIONS

Tri CaoHuu; "Universal Read/Write Buffer for Multiprocessor Cache Coherency Schemes"; IEEE 1993; pp. 785–790.

Milo Tomasevic; "A survey of hardware solutions for maitenance of cache coherency in shared memory mutiprocessors"; 1993 IEEE pp. 863–872.

*Primary Examiner*—Meng-Ai An
*Attorney, Agent, or Firm*—Mark J. Casey; Denis G. Maloney; Arthur W. Fisher

[57] ABSTRACT

A method and apparatus in a computer system for handling cache memory victim data for updating main memory. The invention operates in a computer system having one or more processor modules coupled to main memory by a system bus operating in accordance with a SNOOPING bus protocol. Upon a processor executing a READ of one of the cache memory addresses, cache memory data corresponding to the cache memory address being READ is transmitted into the data interface from the cache memory data storage. The cache memory data is received accumulatively by the data interface during the execution of the READ of the cache memory address information. A determination is made as to whether the cache memory data corresponding to the cache memory address being READ is a cache memory victim. If the determination establishes that it is a cache memory victim, the processor issues a command for transmitting cache memory victim data to main memory over the system bus. In response to the command for transmitting cache memory victim data, the cache memory data which is waiting in the data interface, is transmitted from the data interface to main memory over the system bus.

4 Claims, 4 Drawing Sheets

SYSTEM FOR HANDLING CACHE MEMORY VICTIM DATA WHICH TRANSFERS DATA FROM CACHE TO THE INTERFACE WHILE CPU PERFORMS A CACHE LOOKUP USING CACHE STATUS INFORMATION

FIELD OF THE INVENTION

This invention relates to the field of computer systems and, more particularly, to a computer system with an enhanced cache memory victim data handling operation.

BACKGROUND

Modern computer systems utilize various technologies and architectural features to achieve high performance operation. Innovative arrangements of system components can often result in significant improvements in the capabilities and processing power of the computer system.

Such high performance capabilities can be achieved in computer systems which employ several computer central processing units (i.e., CPUs or processors) arranged on modules in a multiprocessor system configuration. In addition to CPU modules, such a multiprocessor system can further include several I/O modules and memory modules, all coupled to one another by a system bus. The CPUs can be utilized to perform co-operative or parallel processing as well as multi-tasking among them for execution of several applications running simultaneously, to thereby achieve dramatically improved processing power. The capabilities of the overall system can be also enhanced by providing a cache memory at each one of the CPUs in the computer system.

A cache memory comprises a relatively small, yet relatively fast memory device arranged in close physical proximity to a processor. The utilization of cache memories is based upon the principle of locality. It has been found, for example, that when a processor accesses a location in memory, there is a high probability that the processor will continue to access memory locations surrounding the accessed location for at least a certain period of time. Thus, a preselected data block of a large, relatively slow access time memory, such as a main memory module coupled to the processor via a system bus, is fetched from main memory and stored in the relatively fast access cache memory. Accordingly, as long as the processor continues to access data from the cache memory, the overall speed of operation of the processor is maintained at a level significantly higher than would be possible if the processor had to arbitrate for control of the system bus and then perform a memory READ or WRITE operation, with the main memory module, for each data access.

The capabilities of the multiprocessor computer system can be further enhanced by sharing main memory among the CPUs and by operating the system bus in accordance with a SNOOPING bus protocol.

In shared memory multiprocessor systems, it is necessary that the system store a single, correct copy of data being processed by the various processors of the system. Thus, when a processor WRITES to a particular data item stored in its cache, that copy of the data item becomes the latest correct value for the data item. The corresponding data item stored in main memory, as well as copies of the data item stored in other caches in the system, becomes outdated or invalid.

In a write back cache scheme, the data item in main memory is not updated until the processor requires the corresponding cache location to store another data item. Accordingly, the cached data item that has been modified by the processor WRITE remains the latest copy of the data item until the main memory is updated. It is, therefore, necessary to implement a scheme to monitor READ and WRITE transactions to make certain that the latest copy of a particular data item is properly identified whenever it is required for use by a processor.

The well known SNOOPING bus protocol provides such a scheme and the necessary coherency between the various cache memories and the main memory of the computer system. In accordance with the SNOOPING bus protocol a system bus interface of each processor, or other component in the multiprocessor computer system, monitors the high performance system bus for bus activity involving addresses of data items that are currently stored in the processor's cache. Status bits are maintained in TAG stores associated with each cache to indicate the status of each data item currently stored in the cache.

One possible status bit associated with a particular data item is a VALID bit. The VALID bit identifies if the cache entry has a copy of a valid data item in it, i.e., the stored data item is coherent with the latest version of the data item, as may have been written by one of the processors of the computer system.

Another possible status bit associated with a particular data item is a SHARED bit. The SHARED bit identifies if more than one cache in the system contains a copy of the data item. A cache element will transition into this state if a different processor caches the same data item. That is, if when SNOOPING on the system bus, a first interface determines that another cache on the bus is allocating a location for a data item that is already stored in the cache associated with the first interface, the first interface notifies the other interface by asserting a SHARED signal on the system bus, signaling the second interface to allocate the location in the shared state. When this occurs the first interface will also update the state of it's copy of the data item to indicate that it is now in the shared state.

Another possible status bit associated with a particular data item stored in a cache memory can be what is generally called a DIRTY bit. A cache entry is dirty if the data item held in that entry has been updated more recently than main memory. Thus, when a processor WRITES to a location in its cache, it sets the DIRTY bit to indicate that it is now the latest copy of the data item.

While the above described cached, multi-processor computer system with cache memories and SNOOPING bus protocol using VALID, SHARED and DIRTY status bits represents a state-of-the-art model for a high performance computer system, the art has yet to achieve an optimal level of performance efficiency.

For example, a particular cache location address may have a VALID but DIRTY block of data (i.e., the data has changed at that cache address location). If a processor wants to READ another block of data back from main memory and it desires to map the new READ data into the same cache location which has the DIRTY block of data, it is necessary to get the DIRTY block of data out of the cache location and back to main memory before it is overwritten with the new block of data being brought back from main memory. The DIRTY block of data to be sent to main memory before it is overwritten is generally know as a VICTIM.

Such a VICTIM is typically handled in the following manner when the processor executes a LOAD command, the address of the data desired is sent to the cache. The cache returns to the processor status information which allows the processor to determine that the block at that cache address location is not the actual block that the processor is now desirous of being READ and that the block resident in that cache location is DIRTY. As such, the block at that location will become a VICTIM and needs to be moved out. To do so, the processor sends out a READ_MISS command to its system interface, indicating that the block it wishes to read is not in the cache and must be fetched from main memory. Following the READ_MISS command, the processor sends a VICTIM command to the system interface, indicating that there is a cache VICTIM associated with the prior READ_MISS. As this VICTIM command is issued, the cache is again accessed so that the system data interface may copy the VICTIM data into a buffer. When the new block of data associated with the READ_MISS is returned from main memory it overwrites the VICTIM data in the cache. Later, after a VICTIM writeback command has been issued to the system bus, the VICTIM data is written from the data interface buffer into main memory.

A problem with the above described prior art method of handling cache victims for updating main memory is that these operations result in multiple cache accesses over a significant amount of system clock cycles, and ties up the cache for other activity (e.g. precluding the processor from issuing a second cache lookup), thereby impeding the overall performance of the computer system.

Therefore, a need exists for a method and apparatus for cache victim handling so that victim data can be provided to main memory in a minimal amount of cycles and therefore provide a significant gain in the performance of the computer system.

SUMMARY OF THE INVENTION

A method and apparatus in a computer system is provided for handling cache memory victim data. The invention operates in a computer system having one or more processor modules coupled to main memory by a system bus operating in accordance with a SNOOPING bus protocol. Each of said processor modules includes a processor capable of executing a READ of a cache memory coupled to the processor. The cache memory stores cache memory address information, cache memory data and cache memory status information. The processor modules further include a data interface coupled to the system bus and to the storage for the cache memory data. In accordance with the present invention, upon the processor executing a READ of one of the cache memory addresses, cache memory data corresponding to the cache memory address being READ is transmitted into the data interface from the cache memory data storage. The cache memory data is received accumulatively by the data interface during the execution of the READ of the cache memory address information. A determination is made as to whether the cache memory data corresponding to the cache memory address being READ is a cache memory victim. If the determination establishes that it is a cache memory victim, the processor issues a command for transmitting cache memory victim data to main memory over the system bus. In response to the command for transmitting cache memory victim data, the cache memory data which is waiting in the data interface, is transmitted from the data interface to main memory over the system bus.

DETAILED DESCRIPTION

Figure 1:
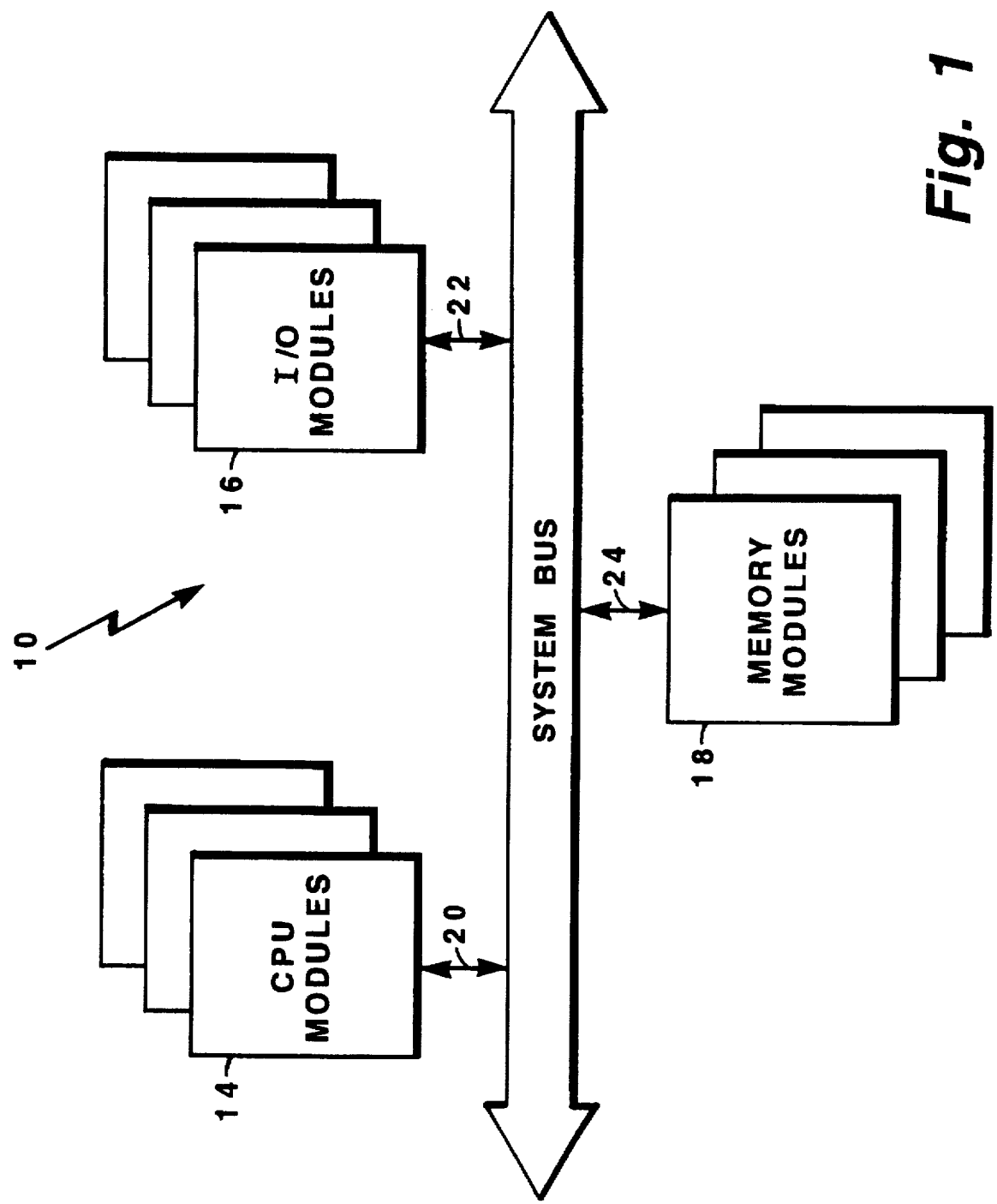
FIG. 1 hows an overview of the general computer system embodying the invention.

FIG. 1 shows a general Computer System 10 having a System Bus 12 with a plurality of CPU modules 14, a plurality of I/O modules 16 and a plurality of Memory Modules 18. The CPU modules, the I/O modules and the memory modules all attach to System Bus 12 through signal lines 20, 22 and 24 respectively. Each of the signal lines 20, 22, 24 can comprise one or more wires depending on the signal transmission protocol used by the components of the system.

The system bus, CPU modules, memory modules and I/O modules perform standard computer system functions. The system bus provides a communication medium for the modules attached thereto. The CPU modules execute instructions and transfer data. The memory modules store instructions and data. The I/O modules provide input/output communication via the system bus to the CPUs and the memory modules.

Figure 2:
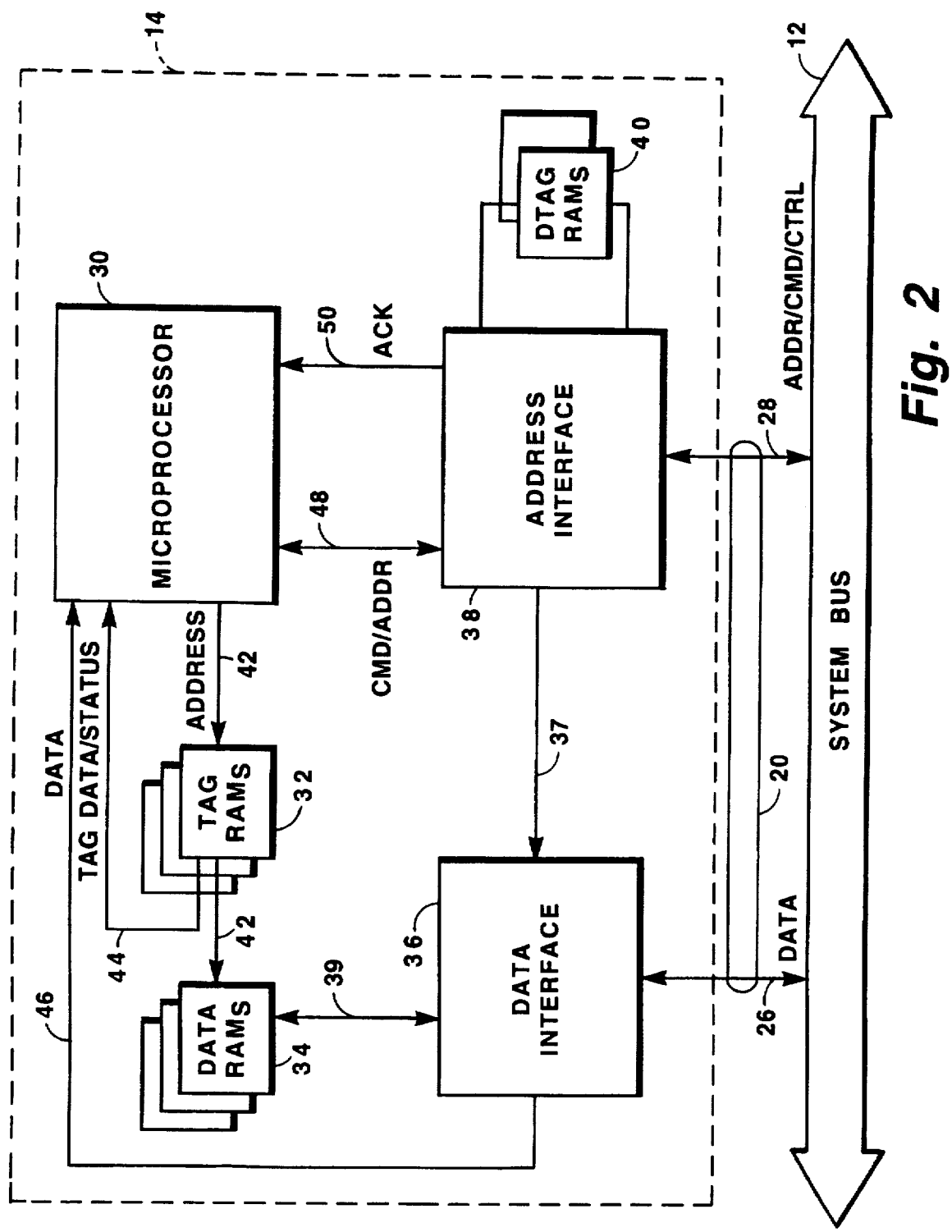
FIG. 2 illustrates one of the CPU Modules of the general computer system.

FIG. 2 shows one of the plurality of CPU modules 14. CPU module 14 connects to System Bus 12 through a plurality of signal lines 20, which include data lines 26 and address/command/control lines 28.

Included on CPU module 14 is Microprocessor 30, one or more Cache TAG RAMs 32, one or more Cache DATA RAMs 34, Data Interface 36, Address Interface 38 and one or more Duplicate TAG (DTAG) RAMs 40. CPU module 14 may contain other elements (not shown) which are used in the operation of the computer system, such as power supplies, clocks, etc. but are not pertinent to the understanding of the present invention.

In its operation, Microprocessor 30 may put out requests for data/instructions from memory. Before having to access Memory Modules 18, caching is invoked using Cache TAG RAMs 32 and Cache DATA RAMs 34. Namely, Microprocessor 30 will first look to see if the desired block of data is in its Cache DATA RAMs 34 before having to obtain the data from Memory Modules 18.

In putting out the memory request, Microprocessor 30 passes an Address over signal lines 42 to the Cache TAG RAMs 32 and Cache DATA RAMs 34 simultaneously. TAG Data/Status information is provided back to Microprocessor 30 over TAG DATA/STATUS lines 44. The TAG Data/Status information is used by Microprocessor 30 to determine if the desired block of data is present in Cache DATA RAMs 34.

The TAG Data/Status information contains both Address information and Status information of the block of data in the Cache DATA RAMs. The Address information portion shows which specific block out of all of memory is held in the particular cache entry. The Status information portion shows the status of that particular cache block. The Status information includes a VALID bit, a SHARED bit and a DIRTY bit as has been described above.

If the memory request, for example an instruction/command desiring a READ of data, is capable of being serviced by a cache entry, the Microprocessor request will then be satisfied by only needing the cache memory access i.e., there was a HIT in the cache. If there is a HIT, data is provided back to Microprocessor 30 over data lines 46. In the preferred embodiment, the HIT data is first provided to Data Interface 36 via data lines 39, which couples it to data lines 46. The operation of Data Interface 36 is described in more detail below.

If the Microprocessor request is not satisfied, i.e., there was a MISS in the cache, the Microprocessor needs to then access main memory. For example, if during the cache READ, the cache state is not VALID, or the addresses in the TAG RAMs do not match the address sent out by Microprocessor, i.e., that block is not in the cache, Microprocessor 30 will issue a command through COMMAND/ADDRESS lines 48 to Address Interface 38. Address Interface 38 responds with an ACKNOWLEDGE (ACK) sent along ACK lines 50 and then issues a command over ADDRESS/COMMAND/CONTROL signal lines 28 to System Bus 12 requesting data to be sent back from one of Memory Modules 18. Data is then returned across the System Bus 12 to the Data Interface 36 over Data Lines 26. Address Interface 38 is the controller for Data Interface 36. For any data movement associated with any command/address received by Address Interface 38, the Address Interface determines the type of data movement (e.g., data is to be received off the system bus) and sends control signals indicating such to Data Interface 36 over signal lines 37. Once Data Interface 36 receives the data, the Address Interface 38 then lets Microprocessor 30 know by signals over the COMMAND/ADDRESS lines 48 that the requested data has come back. The data is sequenced and sent out over data lines 39 into Cache DATA RAMs 34 and into Microprocessor 30 by way of data lines 46. p As shown in FIG. 1, there can be multiple CPU Modules in the computer system configuration. As such, if any other CPU Module 14, or even any I/O Module 16 on the System Bus 12, issues a command to some address, it can affect a cache block of another CPU Module. The status of that block must then be clearly established and the appropriate TAG STATUS bits set. Table 1 below shows what effect system bus actions have on the state of a given cache block.

TABLE 1

| System Bus Operation | Tag Probe Results | Next Cache State |
|---|---|---|
| Read | Match OR Invalid | No Change |
| Write | Match OR Invalid | No change |
| Read | Match AND Dirty | Shared, Dirty |
| Read | Match AND Dirty | Shared, Dirty |
| Write | Match | Invalid |

In Table 1, the "System Bus Operation" column shows the command on System Bus 12. The "Tag Probe Results" column shows the result of a lookup of the address of the command on the system bus in Cache TAG RAMs 32 to see if the address is there (i.e., a Match) and determine information about the addressed block (e.g., its status). The "Next Cache State" column shows the status of the cache as a result of action taken based upon the System Bus Operation undertaken and Tag Probe Results.

In such a multiple CPU system, for every command/address that some other commander module sends across the system bus, the present CPU Module would have to look up that address in its Cache TAG RAMs, find out if its in there and determine what action to take in response to the command/address.

To minimize this additional Cache TAG RAMs lookup activity, one or more DUPLICATE TAG RAMs 40 (DTAGs) are provided. This DTAG approach allows for two identical copies of the Cache TAG information. The information in the Cache TAG RAMs 32 will be for use in conjunction with Microprocessor 30. The information in the DTAG RAMs 40 will be for use in conjunction with System Bus 12.

Therefore, as system bus commands come along System Bus 12, the present CPU Module would look up the command/address in its DTAG to find out if the address is there and determine what action to take in response to the command coming along the system bus.

A related copending application entitled "METHOD AND APPARATUS IN A PIPELINED COMPUTER SYSTEM FOR UPDATING DUPLICATE TAG CACHE INFORMATION" filed by the Assignee of the present invention describes a technique for updating the DTAG status information.

Figure 3:
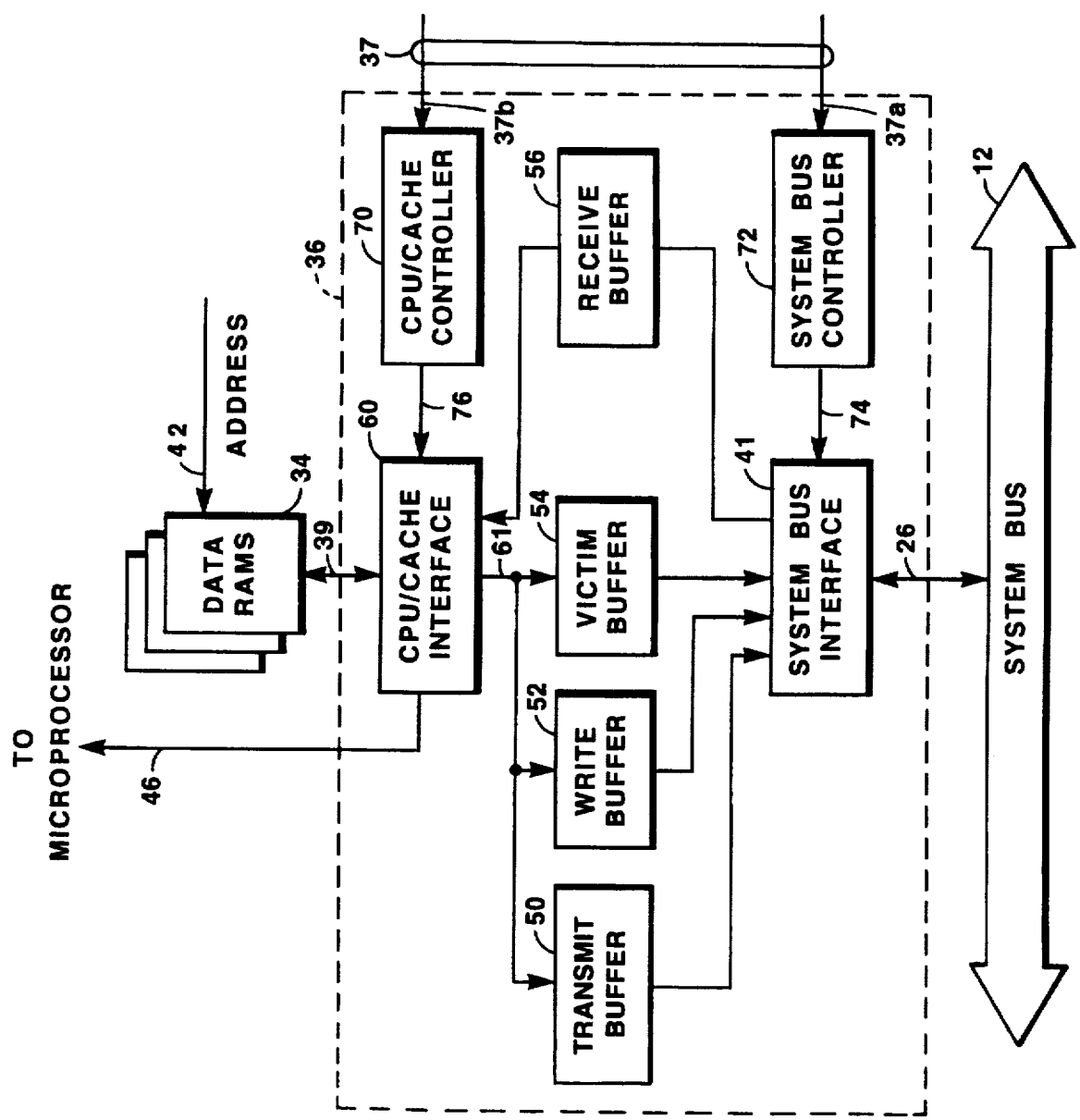
FIG. 3 shows in more detail the Data Interface coupled with Cache DATA RAMs of one of the CPU Modules.

Now referring to FIG. 3, Data Interface 36 on CPU Module 14 is shown in more detail as to its operation in the implementation of the present invention. Data Interface 36 includes System Bus Interface 41, CPU/Cache Interface 60, Transmit Buffer 50, Write Buffer 52, Victim Buffer 54 and Receive Buffer 56. Also included are CPU/Cache Controller 70 and System Bus Controller 72.

System Bus Interface 41 is coupled to System Bus 12 by signal lines 26. Control signals from Address Interface 38 for controlling System Bus Inteface 41 are sent over control signal lines 37a portion of signal lines 37 to System Bus controller 72 which is coupled to System Bus Interface 41 by signal lines 74. In response to signals from Address Interface 38, System Bus Interface 41 takes data from System Bus 12 and sends it to Receive Buffer 56, or if System Bus 12 is being driven by the module upon which these Buffers are located, takes data from Transmit Buffer 50, Write Buffer 52, or Victim Buffer 54, multiplexes them and drives the data onto System Bus 12.

Similarly, control signals from Address Interface 38 for controlling CPU/Cache Inteface 60 are sent over control signal lines 37b portion of signal lines 37 to CPU/Cache Controller 70 which is coupled to CPU/Cache Interface 60 by signal lines 76. In response to signals from Address Interface 38, CPU/Cache Interface 60 takes data from either the Microprocessor 30 or Cache DATA RAMs 34 and loads it into either Transmit Buffer 50, Write Buffer 52 or Victim Buffer 54. Alternatively, as data comes back from System Bus 12 and is put into Receive Buffer 56, CPU/Cache Interface 60 takes Receive Buffer 56 data and drives it to Cache DATA RAMs 34 over signal lines 39 and to Microprocessor 30 over signal lines 46.

Transmit Buffer 50 is used for the situation where some other module on the bus does a READ of data that is DIRTY in the cache of the module containing Transmit Buffer 50. In that case, data would need to be supplied for the READ. Address Interface 38 would do a DTAG probe of its module's Cache DTAG RAMs and determine that the block being READ is there and is DIRTY. Address Interface 38 would, in turn issue a command to Microprocessor 30 that the block of data was to be READ out of the Cache DATA RAMs. Microprocessor 30, in turn, would address the Cache TAG RAMs. The data would be sent to the CPU/Cache Interface 60 over signal lines 39 and into Transmit Buffer 50. When, according to bus protocol of System Bus 12, the data slot in System Bus 12 came for the READ, Address Interface 38 would send commands to Data Interface 36 and drive the data onto System Bus 12.

Write Buffer 52 is used for cases where Microprocessor 30 is doing a WRITE of a block that is SHARED. As the WRITE command is issued by Microprocessor 30, the data associated with the command is simultaneously driven to the Cache DATA RAMs 34 and is written into Write Buffer 52, through CPU/Cache Interface 60. When the WRITE command is issued to System Bus 12 and its data slot comes up, Address Interface 38 will signal Data Interface 36 and the WRITE data will be driven over System Bus 12 to Main Memory 18.

Figure 4:
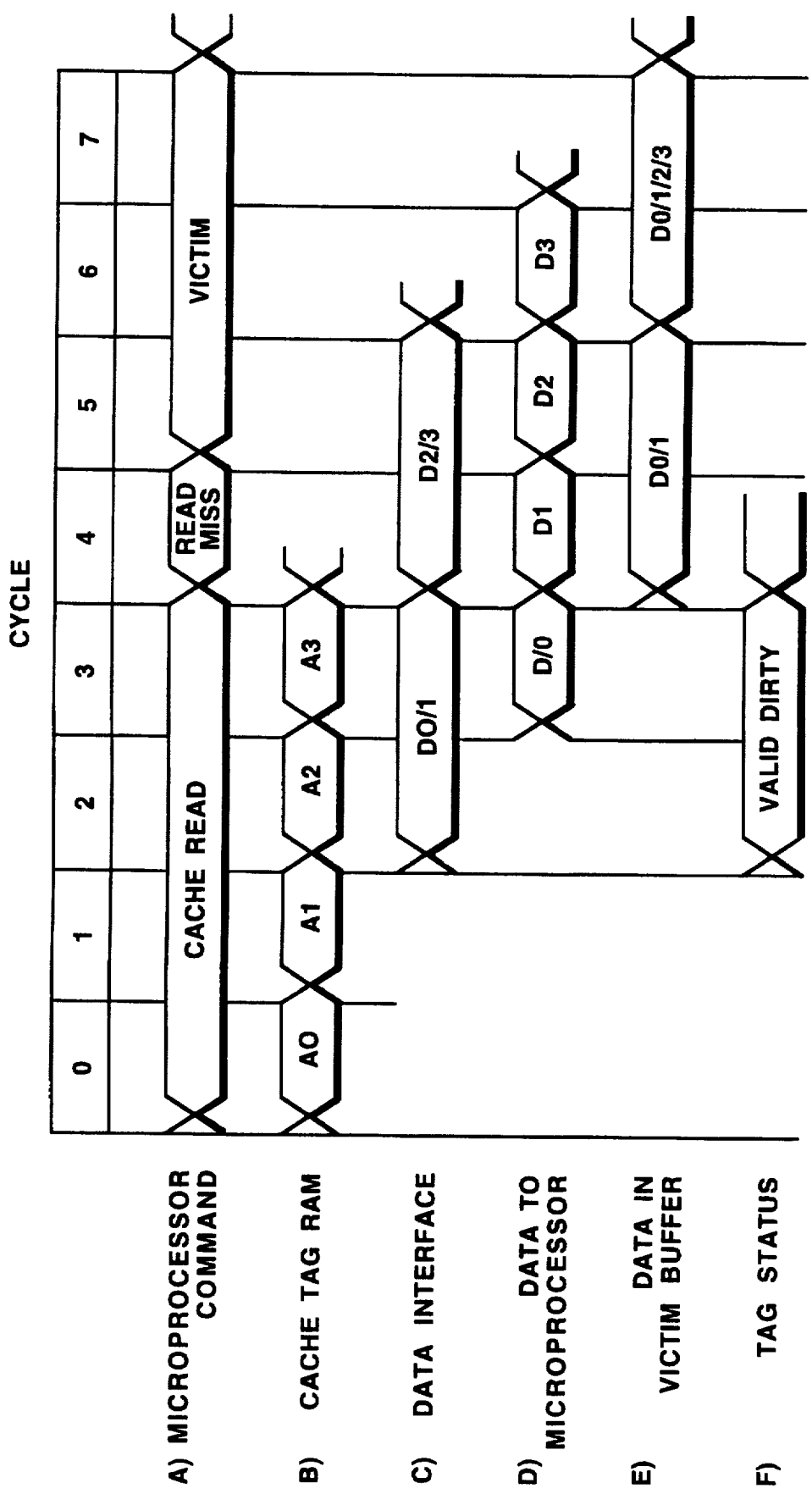
FIG. 4 shows timing diagrams related to VICTIM data handling.

Victim Buffer 54 is used for taking VICTIM data from the Cache DATA RAMs and driving the data over System Bus 12 to main memory 18. The operation of Victim Buffer 54 as shown in FIG. 3 is now described in conjunction with timing diagrams shown in FIG. 4. The situation where Victim Buffer 54 is used is where Microprocessor 30 is executing a READ of cache and the addressed block of data in the Cache DATA RAMs is DIRTY and does not correspond to the desired block. FIG. 4, shows situations (A), (B), (C), (D), (E) and (F) over relative system clock cycles 0 through 7.

When Microprocessor 30 desires a cache memory access pursuant to a READ command (FIG. 4: situation (A) occurring over cycles 0 through 3), the requested address (e.g., four address locations A0, A1, A2 and A3 for four octawords of data) is distributed to Cache TAG RAMs 32 (FIG. 4: situation (B) occurring, correspondingly, over cycles 0 through 3). Two blocks of data (a first 288 bit hexaword comprising D0 and D1 corresponding to addresses A0 and A1 and a second 288 bit hexaword comprising D2 and D3 corresponding to addresses A2 and A3) are brought into CPU/Cache Interface 60 of Data Interface 36 over 288 bit wide signal lines 39 (FIG. 4: situation (C) occurring over cycles 2 and 3 for D0, D1 and over cycles 4 and 5 for D2, D3). The data is immediately sent over 144 bit wide signal lines 46 to Microprocessor 30 (FIG. 4: situation (D) occurring in cycle 3 for D0, in cycle 4 for D1, in cycle 5 for D2 and in cycle 6 for D3). Upon reaching CPU/Cache Interface 60, the data is also put into Victim Buffer 54 in an accumulating manner over 288 bit wide signal lines 61 (FIG. 4: situation (E) occurring for D0, D1 accumulation in cycles 4, with the balance of accumulation occurring in cycle 6.

When there is a DIRTY block in the Cache DATA RAMs and there is a READ of a block that is going to displace it, a VICTIM is generated. When Microprocessor 30 does a READ of its cache memory, it is simultaneously accessing the Cache TAG RAMs and the Cache DATA RAMs. When Microprocessor 30 receives the TAG Data and Status information from signal lines 44, Microprocessor 30 will see that the block that's in the cache is VALID, DIRTY and that its TAG portion does not match, so that there is a READ Miss and a VICTIM (FIG. 4: situation (F) occurring over cycles 2 and 3). As a result of the VALID and DIRTY status, Microprocessor 30 will issue READ Miss and VICTIM commands (FIG. 4: situation (A) occurring over cycles 4 through 7). Microprocessor 30 issues the VICTIM command to Address Interface 38 over Command/Address signal lines 48. When the VICTIM data is ready to be driven to System Bus 12 (i.e., when the VICTIM command is processed in accordance with System Bus 12 bus protocols) Address Interface 38 sends a control signal to Data Interface 36 over signal lines 37. The control signal tells Data Interface 36 to drive data already waiting in Victim Buffer 54 through System Bus Interface 41 and data lines 26 onto System Bus 12 and to the address of the memory module 18 to which the VICTIM data is to be sent.

With the VICTIM data being put into the VICTIM Buffer during a cache READ as it comes out of the Cache DATA RAMs, it is now unnecessary to go through the additional steps of re-addressing the Cache DATA RAMs and executing another READ of the cache to get the VICTIM data ready for transmission over the system bus. By eliminating the extra steps, VICTIM data can be provided to main memory in a minimal amount of cycles and therefore provide a significant gain in the performance of the computer system.

While a preferred embodiment has been described herein, variations will become apparent to those skilled in the art without departing from the principles and spirit of the invention, the scope of which is defined in the appended claims. For example, various sizes and types of buffers and data lines can be used for transferring data from the Cache DATA RAMs into the Data Interface. Also, the Address Interface can monitor Cache TAG status and address information to determine in parallel with the Microprocessor whether there is a victim. This would avoid having the Microprocessor issue a VICTIM command to the Address Interface.

We claim:

1. In a computer system having one or more processor modules coupled to main memory by a system bus operating in accordance with a SNOOPING bus protocol, each of said processor modules including:

a processor, said processor capable of executing a READ of a cache memory coupled to said processor, said cache memory including means for storing cache memory address information, means for storing cache memory data and means for storing cache memory status information, and a data interface coupled to said system bus and to said means for storing said cache memory data, a method of processing cache memory victim data for updating said main memory, comprising the steps of:

upon said processor executing said READ of said cache memory address information, simultaneously transmitting cache memory data corresponding to said cache memory address information into said data interface from said means for storing cache memory data;

receiving said cache memory data accumulatively by said data interface during the execution of said READ of said cache memory address information;

determining if said cache memory data corresponding to said cache memory address information being READ is a cache memory victim by using the cache memory status information;

if said determining establishes that said cache memory data corresponding to said cache memory address information being READ is a cache memory victim, causing said processor to issue a command for transmitting cache memory victim data to said main memory over said system bus; and transmitting, from said data interface to said main memory over said system bus, in response to said command for transmitting cache memory victim data, said cache memory data corresponding to said cache memory address information being READ.

2. The method of processing cache memory victim data as set forth in claim 1 wherein the step of receiving said cache memory data accumulatively by said data interface includes the step of receiving said cache memory data by a buffer coupled to said system bus and to said means for storing said cache memory data, said buffer capable of receiving, accumulatively during execution of said READ, said cache memory data, and of transmitting to said system bus said cache memory data received by said buffer.

3. The method of processing cache memory victim data as set forth in claim 2 wherein said step of determining if said cache memory data corresponding to said cache memory address being READ is a cache memory victim is performed by evaluating cache memory status information corresponding to said cache memory address information being READ to determine if said cache memory status information corresponding to said cache memory address information being READ indicates a DIRTY status.

4. The method of processing cache memory victim data as set forth in claim 3 wherein the step of causing said processor to issue a command for transmitting cache memory victim data to said main memory over said system bus includes the step of issuing a VICTIM command to the address interface which controls the transmitting of said cache memory victim data to said main memory over said system bus.

* * * * *